United States Patent
Richardson et al.

(10) Patent No.: US 7,383,542 B2
(45) Date of Patent: *Jun. 3, 2008

(54) ADAPTIVE MACHINE TRANSLATION SERVICE

(75) Inventors: Stephen Richardson, Redmond, WA (US); Richard Rashid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

This patent is subject to a terminal disclaimer.

(21) Appl. No.: 10/600,297

(22) Filed: Jun. 20, 2003

(65) Prior Publication Data

US 2004/0260532 A1    Dec. 23, 2004

(51) Int. Cl.
*G06F 9/45* (2006.01)

(52) U.S. Cl. .................................... 717/137

(58) Field of Classification Search ............... 717/137
See application file for complete search history.

(56) References Cited

U.S. PATENT DOCUMENTS

| | | | |
|---|---|---|---|
| 5,560,013 A * | 9/1996 | Scalzi et al. ............... 717/138 |
| 6,031,993 A * | 2/2000 | Andrews et al. ............ 717/143 |
| 6,247,174 B1 * | 6/2001 | Santhanam et al. ......... 717/154 |
| 6,278,969 B1 | 8/2001 | King et al. |
| 6,698,011 B1 * | 2/2004 | Reinders et al. ............ 717/124 |
| 7,054,803 B2 * | 5/2006 | Eisele ........................... 704/2 |
| 2002/0107863 A1 * | 8/2002 | Hickey ........................ 707/101 |

FOREIGN PATENT DOCUMENTS

WO    WO 02/054280    7/2002

OTHER PUBLICATIONS

European Search Report.
Richardson et al.; "Achieving commercial-quality translation with example-based methods" Proceedings of MT Summit VIII, Sep. 2001.
Dolan et al.; "MindNet: Acquiring and Structuring Semantic Information from Text," Annual Mtg. Of the Assoc. for Computational Linguistics. vol. 2. May '98 p. 1098-1102.

* cited by examiner

*Primary Examiner*—John Chavis
(74) *Attorney, Agent, or Firm*—Westman, Champlin & Kelly, P.A.

(57) ABSTRACT

An adaptive machine translation service for improving the performance of a user's automatic machine translation system is disclosed. A user submits a source document to an automatic translation system. The source document and at least a portion of an automatically generated translation are then transmitted to a reliable modification source (i.e., a human translator) for review and correction. Training material is generated automatically based on modifications made by the reliable source. The training material is sent back to the user together with the corrected translation. The user's automatic translation system is adapted based on the training material, thereby enabling the translation system to become customized through the normal workflow of acquiring corrected translations from a reliable source.

38 Claims, 10 Drawing Sheets

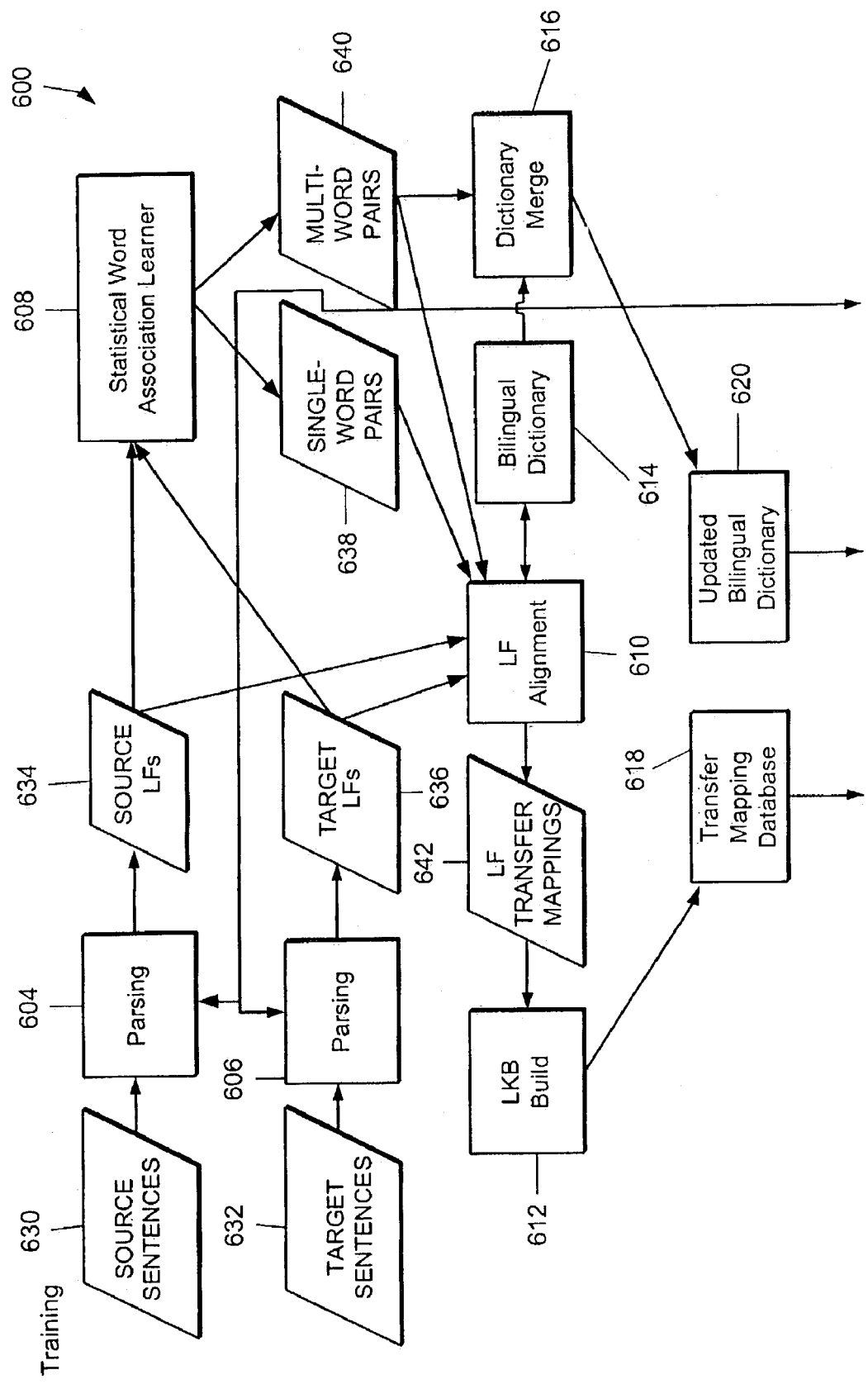
FIG._6A

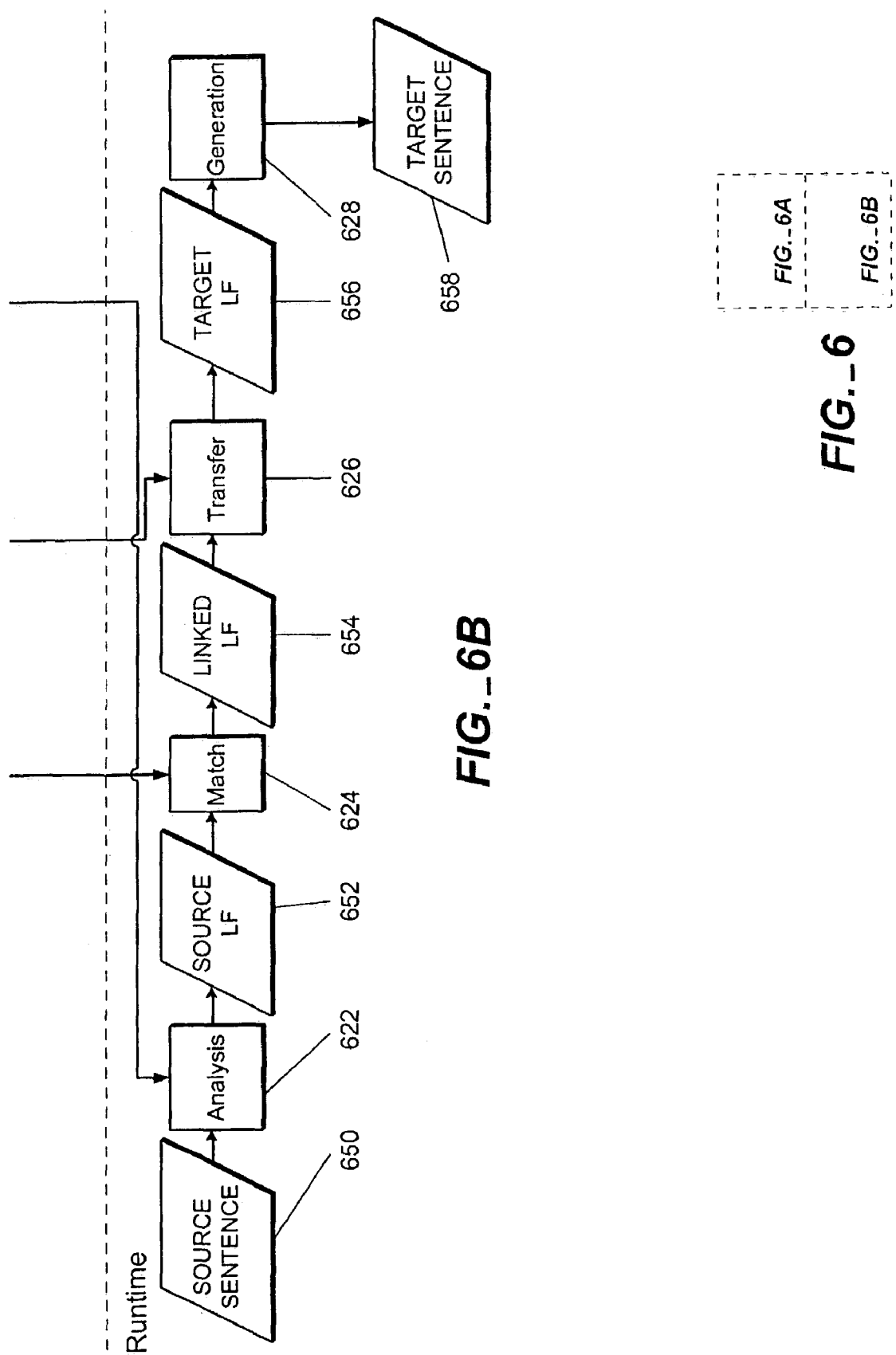

ADAPTIVE MACHINE TRANSLATION SERVICE

BACKGROUND OF THE INVENTION

The present invention deals with machine translation. More specifically, the present invention deals with means for systematically improving the performance of a user's automatic machine translation system within the normal workflow of acquiring corrected translations from a reliable source.

As a result of the growing international community created by technologies such as the Internet, machine translation, more specifically the utilization of a computer system to translate natural language texts, has achieved more widespread use in recent years. In some instances, machine translation can be automatically accomplished. However, human interaction is sometimes integrated into the process of creating a quality translation. Generally speaking, translations that rely on human resources are more accurate but less time and cost efficient than fully automated systems. For some translation systems, human interaction is relied upon only when translation accuracy is of critical importance. The time and cost associated with human interaction generally must be invested every time a particularly accurate translation is desired.

The quality of translations produced by fully automated machine translation has generally not increased with the rising demand for such systems. It is generally recognized that, in order to obtain a higher quality automatic translation for a particular domain (or subject matter), significant customization must be done to the machine translation system. Customization typically includes the addition of specialized vocabulary and rules to translate texts in the desired domain. Such customization is typically achieved by trained computational linguists, who use semi-automated tools to add vocabulary items to online dictionaries, and who write linguistically oriented rules, typically in specialized rule writing languages. This type of customization is relatively expensive.

Overall, translation services, which are available to consumers from a variety of sources, fail to provide cost-efficient, high quality, customized translations. For example, shrink-wrapped and web-based translation systems are currently available to the general public. However, these translation systems are difficult or impossible to customize for a particular domain or subject matter. Commercial-grade translation systems are also available. These systems can be customized for specific domains, however, the customization process is tedious and typically quite expensive. Direct human-based translation services are also available (i.e., web-based and mail order based human translation services). However, human translations typically require payment of a fee for every document to be translated, an expense that never ends.

SUMMARY OF THE INVENTION

Embodiments of the present invention pertain to an adaptive machine translation service for improving the performance of a user's automatic machine translation system. A user submits a source document to an automatic translation system. The source document and at least a portion of an automatically generated translation are then transmitted to a reliable modification source (i.e., a human translator) for review and correction. Training material is generated automatically based on modifications made by the reliable source. The training material is sent back to the user together with the corrected translation. The user's automatic translation system is adapted based on the training material, thereby enabling the translation system to become customized through the normal workflow of acquiring corrected translations from a reliable source.

BRIEF DESCRIPTION OF THE DRAWINGS

FIG. 6 is a block diagram of a machine translation architecture with which the present invention may be practiced.

DETAILED DESCRIPTION OF ILLUSTRATIVE EMBODIMENTS

I. Exemplary Operating Environments

Various aspects of the present invention pertain to an encapsulation of adaptive machine translation within the normal workflow of acquiring corrected translations from a reliable source. However, prior to discussing the invention in more detail, embodiments of exemplary environments in which the present invention can be implemented will be discussed.

Figure 1:
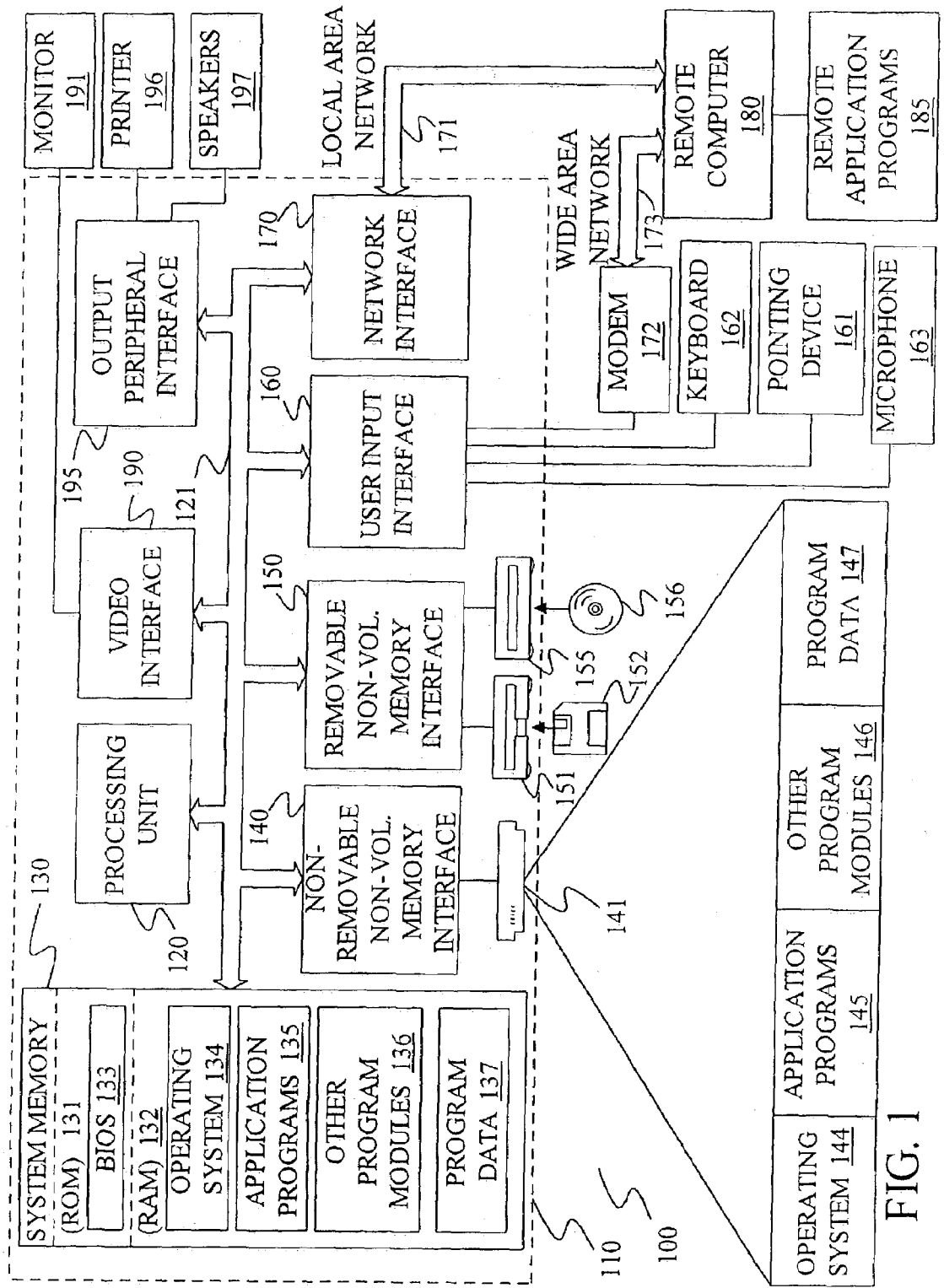
FIG. 1 is a block diagram of one illustrative environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
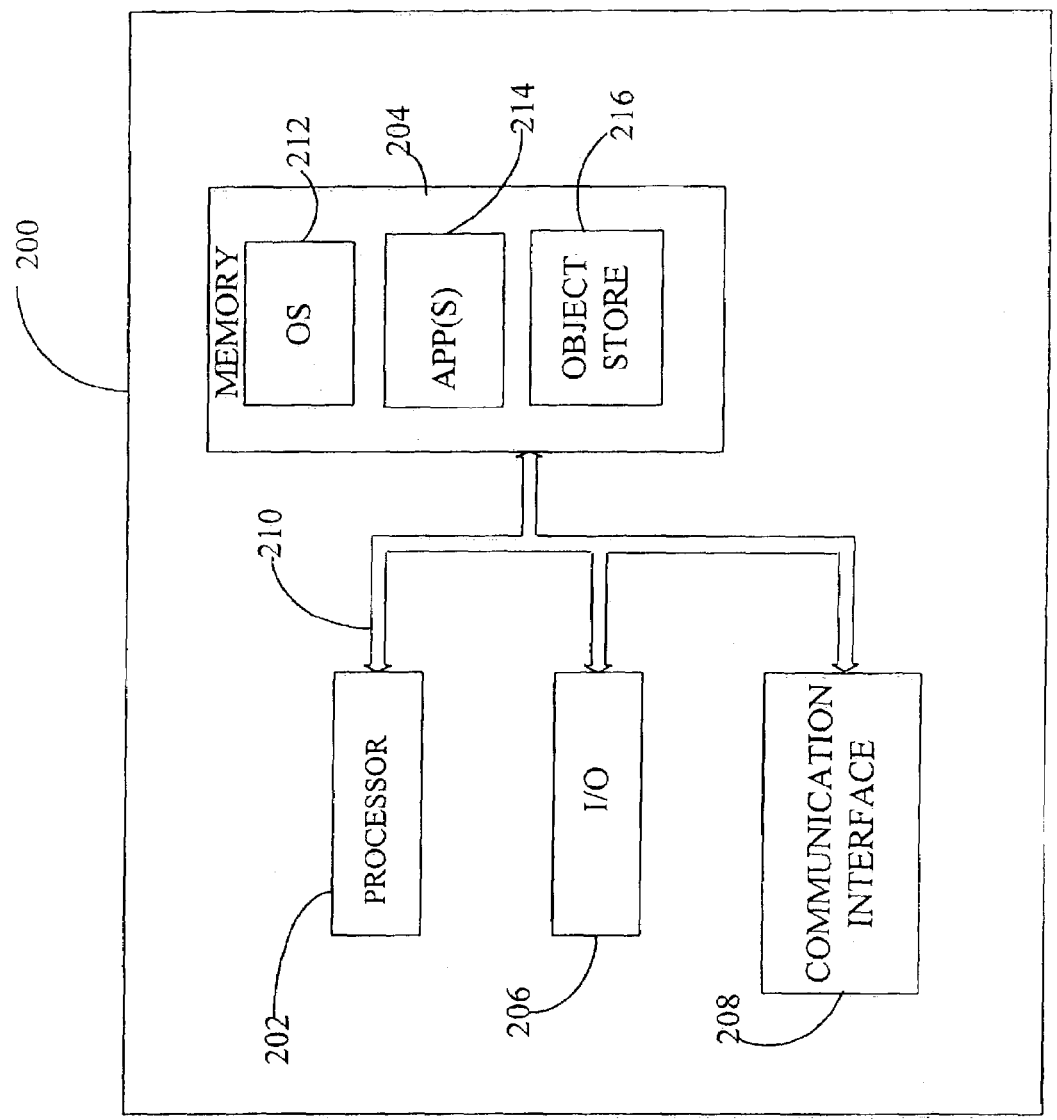
FIG. 2 is a block diagram of another illustrative environment in which the present invention may be practiced.

FIG. 2 is a block diagram of a mobile device 200, which is another exemplary suitable computing environment on which the invention may be implemented. The computing system environment 200 is only another example of a suitable computing environment and is not intended to suggest any limitation as to the scope of use or functionality of the invention. Neither should the computing environment 200 be interpreted as having any dependency or requirement relating to any one or combination of illustrated components.

Mobile device 200 includes a microprocessor 202, memory 204, input/output (I/O) components 206, and a communication interface 208 for communicating with remote computers or other mobile devices. In one embodiment, the components are coupled for communication with one another over suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available form Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

II. Overview Of Adaptive Machine Translation Service

Figure 3:
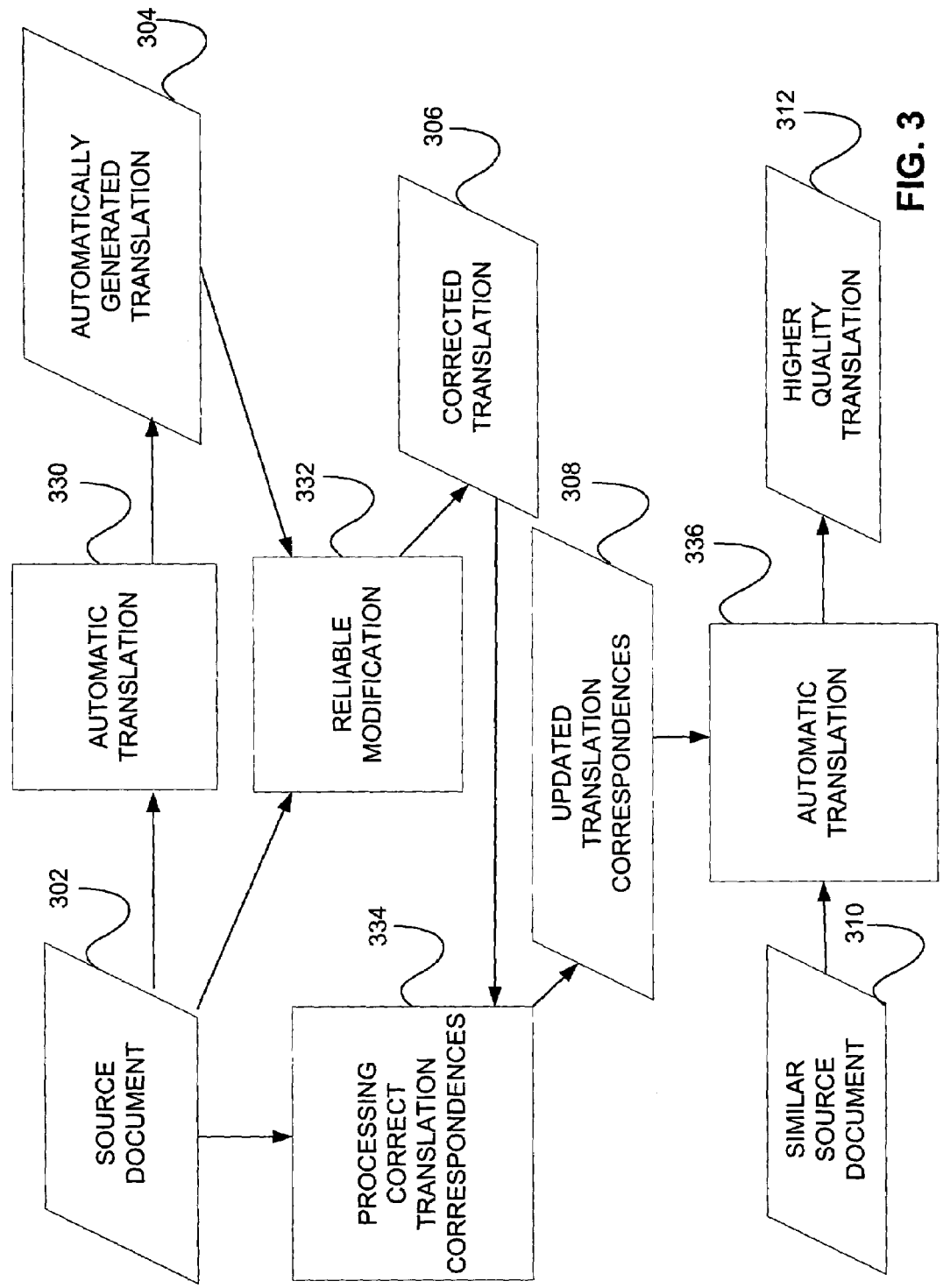
FIG. 3 is a schematic flow diagram illustrating an adaptive machine translation service in accordance with the present invention.

FIG. 3 is a schematic flow diagram illustrating adaptive machine translation within the normal workflow of acquiring corrected translations from a reliable source.

Research has been done to automate the customization of automatic machine translation systems through various machine learning techniques, including statistical and example based techniques. With such techniques, a machine translation system is able to learn translation correspondences from already translated materials (often referred to as bitexts or bilingual corpora), which contain sentences in one (source) language and the corresponding translated (target) sentences in another language. In addition, such MT systems may learn additional correspondences from "comparable" corpora, or texts which are not precise translations of each other, but which both describe similar concepts and events in both source and target languages. They may further employ monolingual corpora to learn fluent constructions in the target language. In accordance with one general aspect of the present invention, these customization techniques are applied and taken advantage of within a traditional document management environment. Specifically, data for training an automatic translation system is generated during the normal course of a system user producing documents, obtaining corresponding translations, and correcting the translations. The training data enables a systematic customization of the user's automatic machine translation system.

With reference to FIG. 3, embodiments of the present invention pertain to an encapsulation of an adaptive machine translation system within a document management or workflow environment wherein users submit a source document 302 to an automatic translator on the user's computer (or on a server associated with the user) for translation. This action is represented by block 330. The source document 302 and an automatically generated translation 304 are transmitted to a reliable modification source (i.e., a human translator) for review and correction. This action is represented by block 332.

A corrected translation 306 and the original source document 302 are processed to create a collection of updated and assumedly accurate translation correspondences 308. This action is represented by block 334. In accordance with one embodiment, correspondences 308 are generated by a self-customizing machine translation system that runs in parallel to a self-customizing machine translation system maintained by the user. In accordance with one embodiment, the updated translation correspondences 308 are placed into an updated database (or, if a statistical machine translation system is being used, they are reflected in an updated table of statistical parameters) which is sent back to the user together with the corrected, translated document. The updates are assimilated into the user's automatic machine translation system. The next time the user attempts to translate similar textual material 310, the system automatically produces a higher quality translation 312, based on the updates that were returned with previously corrected documents. This action is represented by block 336. It should be noted that the training, and all similar training described herein, illustratively benefits subsequent translations in both directions of a language pair (i.e., Spanish-to-English and English-to-Spanish).

It should be noted that many different types of training data can be generated based on corrected translation 306 and source document 302. Many different types of training data can be utilized to adapt the user's automatic translation system. Updating translation correspondences is but one example within the scope of the present invention. The updating of any knowledge source is within the scope. Any updating of any statistical or example based trainer is also within the scope. Specific examples will be described in detail below.

As the user acquires automatic translation of various documents and sends the results out for reliable post-editing (i.e., correction and modification), the user's automatic translation system gradually adapts itself to be able to translate similar documents more effectively. The necessity for costly customization is eliminated, and the user will subsequently enjoy higher quality automatic translations. The adaptation and customization of the user's automatic translation system illustratively happens "behind the scenes" as the user goes about the normal routine of acquiring quality translations.

In accordance with one embodiment, automatically generated translation 304 includes an automatically generated confidence metric that indicates the quality of the entire translation and/or a portion thereof. The confidence metric is illustratively based on the user's projected satisfaction with the output. The generation and utilization of such a confidence metric is described in U.S. patent application Ser. No. 10/309,950, entitled SYSTEM AND METHOD FOR MACHINE LEARING A CONFIDENCE METRIC FOR MACHINE TRANSLATION, filed on Dec. 4, 2002, which is assigned to the same entity as the present application, and which is herein incorporated by reference in its entirety.

Figure 4:
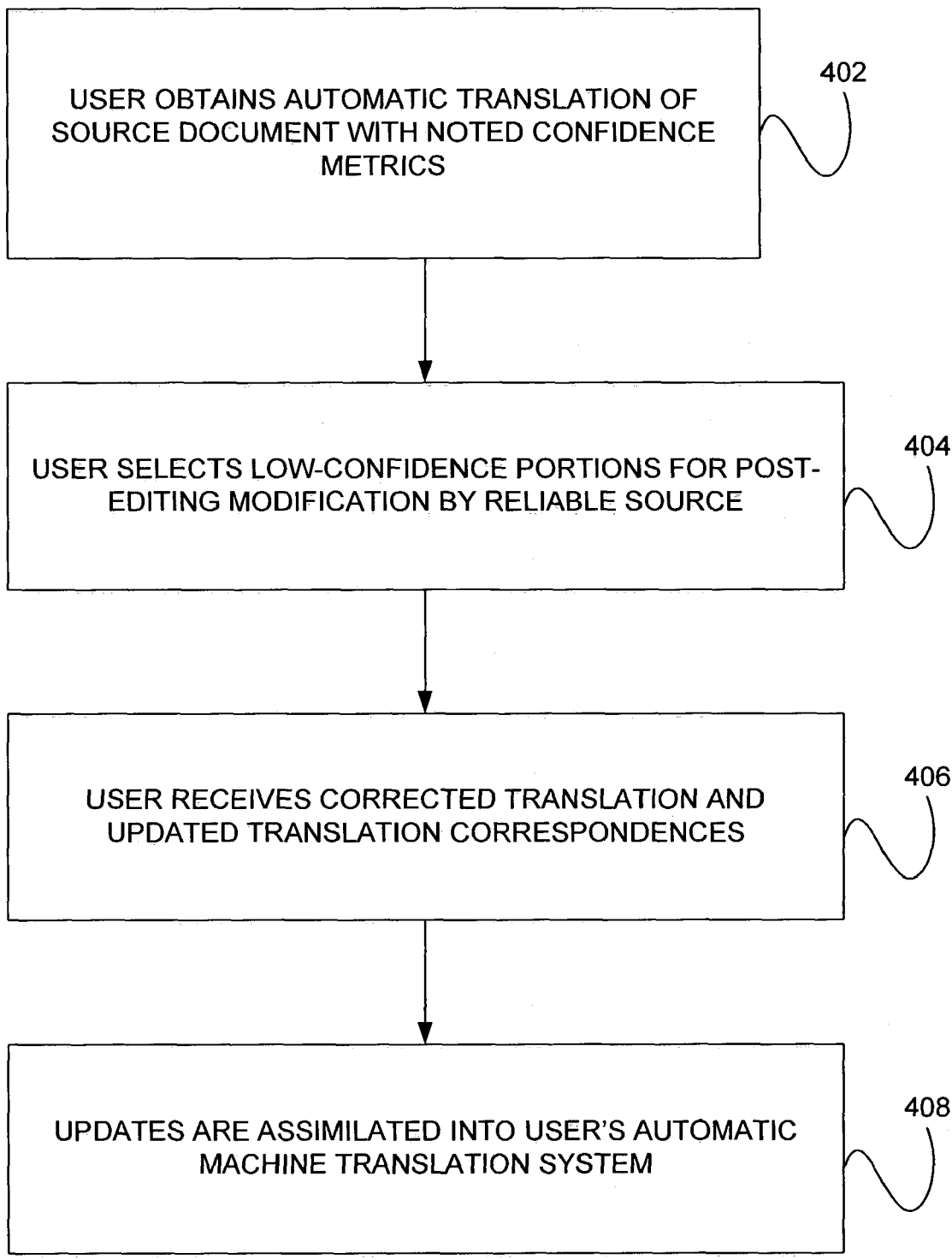
FIG. 4 is a flow chart illustrating utilization of a confidence metric in the context of the adaptive machine translation service.

FIG. 4 is a flow chart illustrating how the confidence metric is incorporated into the described self-customizing machine translation system. In accordance with block 402, the user obtains an automatic translation of a source document. The document includes noted confidence metric information that pertains to the document in its entirety and/or one or more individual portions thereof. In accordance with block 404, the user selects for post-editing one or more portions having a low confidence rating. These portions are transferred to a reliable modification source (i.e., a human translator) for correction. The corrected portions are processed with the original source document to create a collection of updated and assumedly accurate translation correspondences. In accordance with one embodiment, the processing is accomplished by a self-customizing machine translation system that runs in parallel with a self-customizing machine translation system maintained by the user.

In accordance with block 406, the updated translation correspondences are sent back to the user together with the corrected, translated portions (or the corrected, translated document in its entirety). In accordance with block 408, the updates are assimilated into the user's automatic machine translation system. The next time the user attempts to translate similar textual material, their automatic machine translation system will produce a higher quality translation.

III. Specific Applications

Figure 5A:
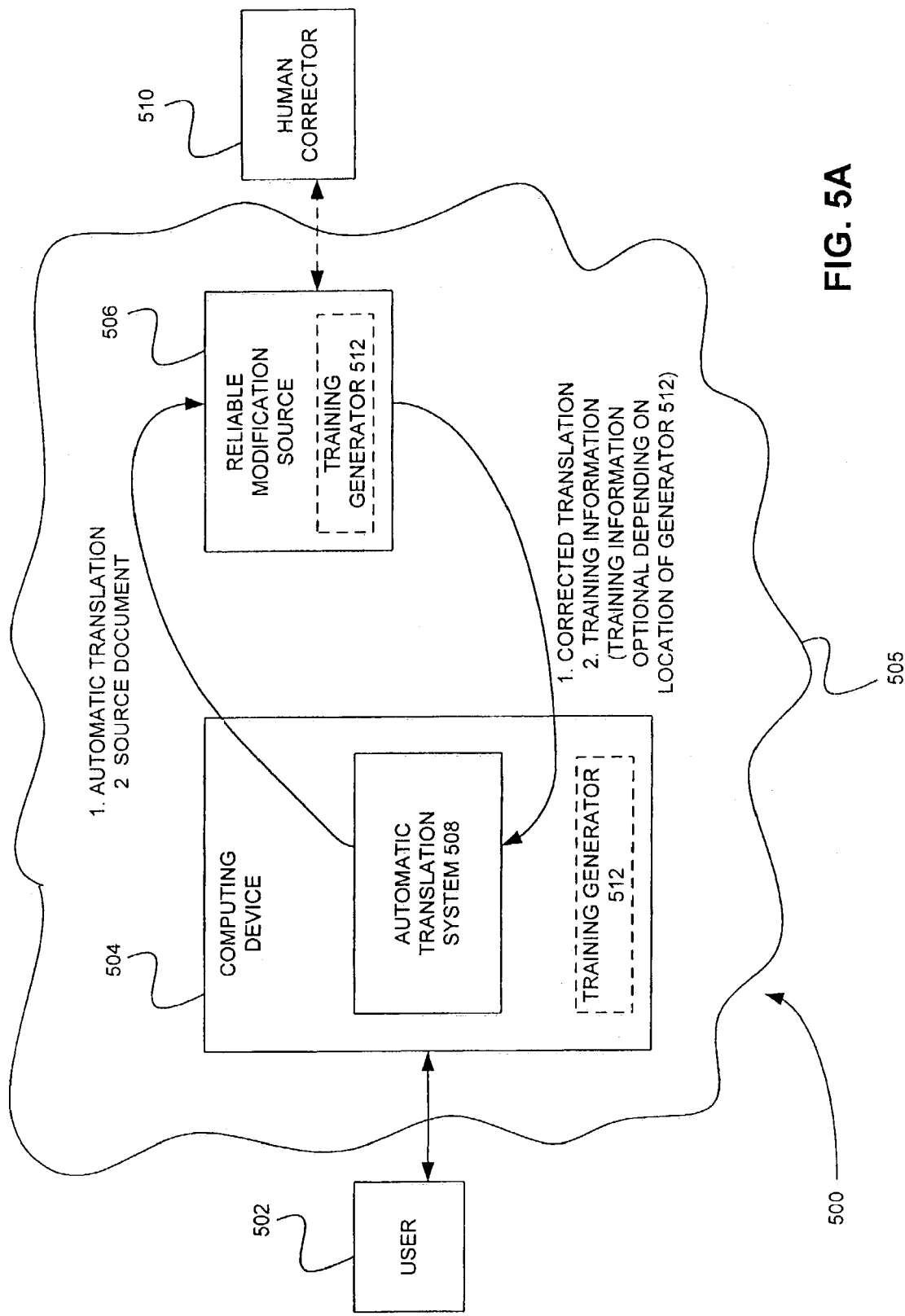
FIG. 5A is a block diagram of one specific application of embodiments of the present invention.
Figure 5B:
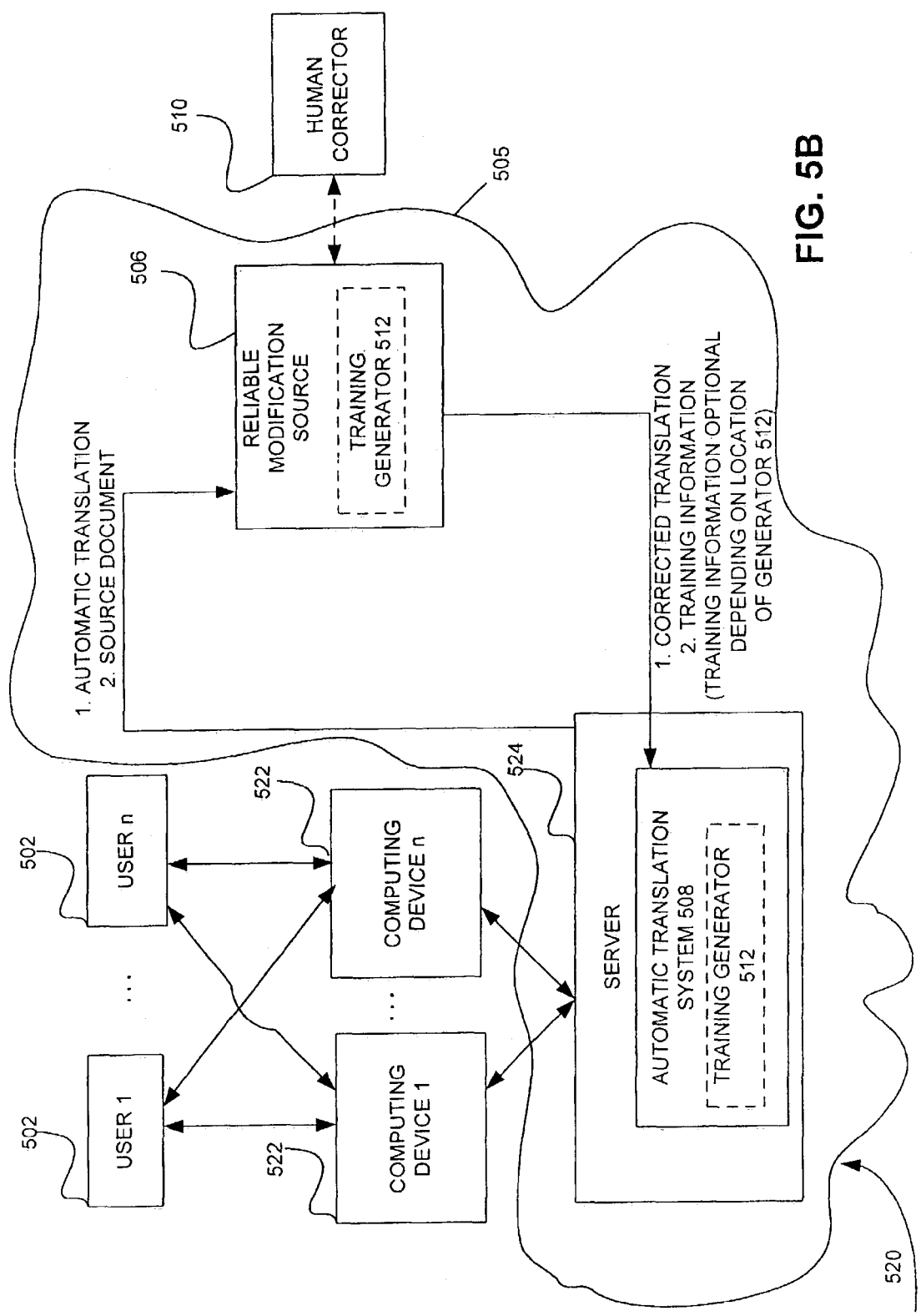
FIG. 5B is a block diagram of another specific application of embodiments of the present invention.

FIGS. 5A and 5B are block diagrams of specific applications of the above-described embodiments of an adaptive machine translation system. The specific applications are only examples and are not intended to suggest any limitation as to the scope of use or functionality of the invention. Neither should the specific applications be interpreted as having any dependency or requirement relating to any one or combination of illustrated components.

FIG. 5A is a block diagram of a computing environment 500. A user 502 manipulates a computing device 504 to enable interaction with a reliable modification source 506 via a computer network 505 (i.e., the Internet). Source 506 is illustratively a translation service implemented on a computing device and provided to computing device 504 and its user 502 over network 505.

Computing device 504, as well as the computing device upon which modification source 506 is implemented, can be any of a variety of known computing devices, including but not limited to any of those described in relation to FIGS. 1 and 2. Communication between computing device 504 and modification source 506 over network 505 can be accomplished utilizing any of a variety of known network communication methods, including but not limited to any of those described in relation to FIGS. 1 and 2. In accordance with one embodiment, computing device 504 is a client wireless mobile device configured for communication with a server-implemented modification source 506 over a wireless network. In accordance with another embodiment, computing device 504 is a client personal computer configured for communication with a server-implemented modification source 506 over the Internet. These are only two of many specific embodiments within the scope of the present invention.

Computing device 504 includes an automatic translation system 508. User 502 illustratively submits a text sample to system 508 for generation of a corresponding automatic translation. Assuming that user 502 is not satisfied with one or more portions of the translation generated by translation system 508 (i.e., user is not satisfied with an indicated low confidence metric), then the automatic translation is submitted to modification source 506 along with a copy of the source document. The automatic translation is corrected at source 506. In accordance with one embodiment, a human translator 510 corrects the automatic translation. In accordance with another embodiment, a reliable automated system performs the corrections. The corrected translation is returned to computing device 504 for delivery to user 502.

A training generator 512 is utilized to process the automatic translation, the corrected translation, and/or the source document in order to generate a collection of training data that can be utilized to adapt automatic translation system 408. Training generator 512 is a component stored on modification source 506, or on computing device 504, or in a separate but accessible independent location (i.e., stored on an independent and accessible server). When training generator 512 is stored with modification source 506, generated training information is illustratively transferred to automatic translation system 508 with the associated corrected translation. When training generator 512 is stored with computing device 504, then information is directly implemented into system 508. Storing training generator 512 with modification source 506 reduces the storage and processing requirements imposed on computing device 504. Also, this configuration enables training generator 512 to be maintained and operated from a centralized location.

In accordance with one embodiment, to facilitate the adaptation of automatic translation system 508, a training generator 512 resides on both reliable modification source 506 and computing device 508. The pair of training generators 512 are illustratively the same or substantially similar. The pair of training generators 512 are illustratively associated with self-customizing machine translation systems (such a system will be described in detail in relation to FIG. 6). After post-editing has been completed with modification source 506, the generated corrected translation, along with the original source text, is illustratively processed by a "training" phase of the self-customizing machine translation system implemented on modification source 506. During the training phase, the correct translation correspondences are learned. The correspondences are put in an updated database (or, if a statistical system is being used, they are reflected in an updated table of statistical parameters), which is sent to the version of the machine translation system implemented on computing device 504. The updates are then automatically assimilated into the version of the self-customizing system on the user's computer (or, as will be described below, into the version maintained on a server). The next time the user attempts to translate similar textual material, his/her translation system automatically produces higher quality translation, based on the updates that were returned with previously corrected documents.

In accordance with one embodiment, reliable modification source 506 is associated with a server operating on network 505. Training generator 512 is maintained and operated on the same server. The translations and training information provided in association with modification source 506 to user 502 is illustratively, although not necessarily, provided on a paid basis (i.e., paid for on a per-time or subscription basis).

FIG. 5B is a block diagram of a computing environment 520. Elements in FIG. 5B that are the same or similar as elements in FIG. 5A have been labeled utilizing the same or similar reference numerals. In FIG. 5B, one or more users 502 interact with one ore more computing devices 522 that are connectable to a server 524. An automatic translation system 508, which is illustratively associated with a user 502, is stored and maintained on server 524. Server 524 is connectable to network 505. A user 502 manipulates a computing device 522 to enable interaction with reliable modification source 506, which is also connectable to network 505. Modification source 506 is illustratively a translation service provided over network 505 to a user 502 via a computing device 504.

System 520 operates in the same manner as system 500, however, automatic translation system 508 can potentially be accessed by multiple computing devices to accomplish automatic translation for one or more individual users 502. Accordingly, translation system 508 can be adapted and updated with training information associated with documents submitted by multiple users. The translation accuracy of translation system 508 will evolve to accommodate multiple users 502. This is particularly desirable when the multiple users have a common connection that might cause them to generate and translate documents within a single domain or area of subject matter (i.e., they work in the same industry, for the same company, etc.).

IV. Specific Application With Machine Translation System Employing Auctomatic Customization Up to this point, automatic translation system 508 has been described generically. The precise details of system 508 are not critical to the present invention. Further, an exact scheme as to how translation system 508 assimilates the described training data has not been provided. The present invention is not limited to any one particular type of training data, nor to any one method for assimilating the data. However, a particular automatic translation system and corresponding scheme for assimilating training data will be described in relation to FIG. 6.

It is known for some automatic translation systems to employ automatic techniques for customizing a system to accommodate translation for a previously unknown vocabulary (i.e., to accommodate translation for a specialized domain). Embodiments of the present invention are conveniently applicable in the context of such a translation system. Such a system is described in U.S. patent application Ser. No. 09/899,755, entitled SCALEABLE MACHINE TRANSLATION SYSTEM, filed on Jul. 5, 2001, which is assigned to the same entity as the present application, and which is hereby incorporated by reference in its entirety. Portions of the system described in the incorporated reference will be described in relation to FIG. 6.

Prior to discussing the automatic translation system associated with FIG. 6, a brief discussion of a logical form may be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological and syntactic analysis on an input text to produce conventional phrase structure analyses augmented with grammatical relations. Syntactic analyses undergo further processing in order to derive logical forms, which are data structures that describe labeled dependencies among content words in the textual input. Logical forms can normalize certain syntactical alternations, (e.g., active/passive) and resolve both intrasentential anaphora and long distance dependencies. A logical form can be represented as a graph, which helps intuitively in understanding the elements of logical forms. However, as appreciated by those skilled in the art, when stored on a computer readable medium, the logical forms may not readily be understood as representing a graph, but rather a (dependency) tree.

A logical relation consists of two words joined by a directional relation type, such as:
LogicalSubject, LogicalObject,
IndirectObject;
LogicalNominative, LogicalComplement, LogicalAgent;
CoAgent, Beneficiary;
Modifier, Attribute, SentenceModifier;
PrepositionalRelationship;
Synonym, Equivalence, Apposition;
Hypernym, Classifier, SubClass;
Means, Purpose;
Operator, Modal, Aspect, DegreeModifier, Intensifier;
Focus, Topic;
Duration, Time;
Location, Property, Material, Manner, Measure, Color, Size;
Characteristic, Part;
Coordinate;
User, Possessor;
Source, Goal, Cause, Result; and
Domain.

A logical form is a data structure of connected logical relations representing a single textual input, such as a sentence or part thereof. The logical form minimally consists of one logical relation and portrays structural relationships (i.e., syntactic and semantic relationships), particularly argument and/or adjunct relation(s) between important words in an input string.

The particular code that builds logical forms from syntactic analyses is illustratively shared across the various source and target languages that the machine translation system operates on. The shared architecture greatly simplifies the task of aligning logical form segments from different languages since superficially distinct constructions in two languages frequently collapse onto similar or identical logical form representations.

With this background in mind, FIG. 6 is a block diagram of an architecture of a machine translation system 600 in accordance with one aspect of the present invention. System 600 is a data-driven machine translation system that combines rule-based and statistical techniques with example based transfer. The system is capable of learning knowledge of lexical and phrasal translations directly from data. The central feature of system 600's training mode is an automatic logical form alignment procedure that creates the system's translation example base from sentence-aligned bilingual corpora.

Machine translation system 600 is configured to automatically lean how to translate from bilingual corresponding texts. The system can be customized for a particular text by processing its sentences and their corresponding human translations, resulting in higher quality subsequent translations for material similar to the text. Machine translation system 600 is also configured to conveniently accommodate built-in confidence scores that indicate the quality of an entire translation and/or a portion thereof.

System 600 includes parsing components 604 and 606, statistical word association learning component 608, logical form alignment component 610, lexical knowledge base building component 612, bilingual dictionary 614, dictionary merging component 616, transfer mapping database 618 and updated bilingual dictionary 620. During training and translation run time, the system 600 utilizes analysis component 622, matching component 624, transfer component 626 and/or generation component 628. In accordance with one embodiment, parsing component 604 and analysis component 622 are the same component, or at least identical to each other.

A bilingual corpus is used to train the system. The bilingual corpus includes aligned translated sentences (e.g., sentences in a source or target language, such as English, in 1-to-1 correspondence with their human-created translations in the other of the source or target language, such as Spanish). It should be noted that the translation "sentences" in the bilingual corpus are not limited to actual complete sentences but can instead be a collection of sentence segments. During training, sentences are provided from the aligned bilingual corpus into system 600 as source sentences 630 (the sentences to be translated), and as target sentences 632 (the translation of the source sentences). Parsing components 604 and 606 parse the sentences from the aligned bilingual corpus to produce source logical forms 634 and target logical forms 636.

During parsing, the words in the sentences are converted to normalized word forms (lemmas) and can be provided to statistical word association learning component 608. Both single word and multi-word associations are iteratively hypothesized and scored by learning component 608 until a reliable set of each is obtained. Statistical word association learning component 608 outputs learned single word translation pairs 638 as well as multi-word pairs 640.

The multi-word pairs 640 are provided to a dictionary merge component 616, which is used to add additional entries into bilingual dictionary 614 to form updated bilingual dictionary 620. The new entries are representative of the multi-word pairs 640.

The single word pairs 638, along with source logical forms 634 and target logical forms 636 are provided to logical form alignment component 610. Briefly, component 610 first establishes tentative correspondences between nodes in the source and target logical forms 630 and 636, respectively. This is done using translation pairs from a bilingual lexicon (e.g. bilingual dictionary) 614, which can be augmented with the single and multi-word translation pairs 638, 640 from statistical word association learning component 608. After establishing possible correspondences, alignment component 610 aligns logical form nodes according to both lexical and structural considerations and creates word and/or logical form transfer mappings 642.

Basically, alignment component 610 draws links between logical forms using the bilingual dictionary information 614 and single and multi-word pairs 638, 640. The transfer mappings are optionally filtered based on a frequency with which they are found in the source and target logical forms 634 and 636 and are provided to a lexical knowledge base building component 612.

While filtering is optional, in one example, if the transfer mapping is not seen at least twice in the training data, it is not used to build transfer mapping database 618, although any other desired frequency can be used as a filter as well. It should also be noted that other filtering techniques can be used as well, other than frequency of appearance. For example, transfer mappings can be filtered based upon whether they are formed from complete parses of the input sentences and based upon whether the logical forms used to create the transfer mappings are completely aligned.

Component 612 builds transfer mapping database 618, which contains transfer mappings that basically link words and/or logical forms in one language, to words and/or logical forms in the second language. With transfer mapping database 618 thus created, system 600 is now configured for runtime translations. During translation run time, a source sentence 650, to be translated, is provided to analysis component 622. Analysis component 622 receives source sentence 650 and creates a source logical form 652 based upon the source sentence input.

The source logical form 652 is provided to matching component 624. Matching component 624 attempts to match the source logical form 652 to logical forms in the transfer mapping database 618 in order to obtain a linked logical form 654. Multiple transfer mappings may match portions of source logical form 652. Matching component 624 searches for the best set of matching transfer mappings in database 618 that have matching lemmas, parts of speech, and other feature information. The set of best matches is found based on a predetermined metric. For example, transfer mappings having larger (more specific) logical forms may illustratively be preferred to transfer mappings having smaller (more general) logical forms. Among mappings having logical forms of equal size, matching component 624 may illustratively prefer higher frequency mappings. Mappings may also match overlapping portions of the source logical form 652 provided that they do not conflict with each other in any way. A set of mappings collectively may be illustratively preferred if they cover more of the input sentence than the alternative sets.

After a set of matching transfer mappings is found, matching component 624 creates links on nodes in the source logical form 652 to copies of the corresponding target words or logical form segments received by the transfer mappings, to generate linked logical form 654. Links for multi-word mappings are represented by linking the root nodes of the corresponding segments, then linking an asterisk to the other source nodes participating in the multi-word mapping. Sublinks between corresponding individual source and target nodes of such a mapping may also illustratively be created for use during transfer. Transfer component 626 receives linked logical form 654 from matching component 624 and creates a target logical form 656 that will form the basis of the target translation. This is done by performing a top down traversal of the linked logical form 654 in which the target logical form segments pointed to by links on the source logical form 652 nodes are combined. When combining together logical form segments for possibly complex multi-word mappings, the sublinks set by matching component 624 between individual nodes are used to determine correct attachment points for modifiers, etc. Default attachment points are used if needed.

In cases where no applicable transfer mappings are found, the nodes in source logical form 652 and their relations are simply copied into the target logical form 656. Default single word translations may still be found in transfer mapping database 618 for these nodes and inserted into target logical form 656. However, if none are found, translations can illustratively been obtained from updated bilingual dictionary 620, which was used during alignment.

Generation component 628 is illustratively a rule-based, application-independent generation component that maps from target logical from 656 to the target string (or output target sentence) 658. Generation component 628 may illustratively have no information regarding the source language of the input logical forms, and works exclusively with information passed to it by transfer component 626. Generation component 628 also illustratively uses this information in conjunction with a monolingual (e.g., for the target language) dictionary to produce target sentence 658. One generic generation component 628 is thus sufficient for each language.

It can thus be seen that system 600 parses information from various languages into a shared, common, logical form so that logical forms can be matched among different languages. The system can also utilize simple filtering techniques in building the transfer mapping database to handle noisy data input. Therefore, system 600 can be automatically trained using a large number of sentence pairs.

Turning attention back to the adaptive automatic translation system described in FIGS. 3, 4, 5A and 5B, the described system 600 can illustratively be implemented as the user's adaptive automatic translation system (i.e., translation system 508) In accordance with one embodiment, at least a portion of a translation produced by system 600 is illustratively sent to a reliable modification. source (i.e., source 506) for correction (i.e., a user selects portions with low confidence metric for modification). Training information is generated based on corrections made (training information generated by training generator 512). System 600 receives and processes the training data. In accordance with one embodiment, system 600 processes a bilingual corpus that corresponds to corrections made. Users of translation system 600 will subsequently obtain higher quality translations for similar texts.

In accordance with one embodiment, to facilitate the adaptation of the user's automatic translation system, a system 600 resides on both the reliable modification source and the user's computing device (or a related server). The pair of system 600's illustratively run in parallel to one another. After post-editing has been completed with the modification source, the generated corrected translation, along with the original source text, is illustratively processed by the "training" phase of the version of system 600 implemented on the modification source. During the training phase, the correct translation correspondences are learned. The correspondences are then put into an updated database, which is sent to the version of system 600 implemented on the user's computing device (or an associated server). The updates can be sent with the corrected translation or independently. The updates are automatically assimilated into the user's version of system 600. The next time the user attempts to translate similar textual material, the user's system 600 automatically produces higher quality translation, based on the updates that were returned with previously corrected documents.

The updating of system 600 based on training information could be accomplished in any of a variety of ways, and no particular way is critical to the present invention. The training data provided to system 600 could be in a variety of different forms appropriate for accomplishing adaptation. As was mentioned, in accordance with one embodiment, the training data is a bilingual corpus (i.e., sentence pairs 630 and 632 in FIG. 6) In accordance with another embodiment, the training generator (i.e., generator 512 in FIGS. 5A and 5B) generates and supplies system 600 with an update for parser 604 and/or parser 606 based on corrections made (i.e., update mandates that in the future XY should be treated as X, etc.). In accordance with another embodiment, the training generator generates an update based on changes made for the single word pairs maintained by translation system 600. In accordance with another embodiment, the training generator generates an update for transfer mapping database 618 based on corrections made. In accordance with another embodiment, the training generator directly or indirectly rebuilds transfer mapping database 618 based on corrections made. The updating of any knowledge source is within the scope of the present invention.

MindNet is a term utilized to describe a structure such as the linguistic structure database of logical forms associated with translation system 600 (i.e., transfer mapping database 618). The term MindNet was coined by Microsoft Corporation of Redmond, Washington. In accordance with one embodiment of the present invention, utilization of training information to adapt system 600 based on corrections made by the reliable modification source involves manipulation (i.e., an updating) of the MindNet. The process of updating can occur on the user's system (or on a server associated with the user) or remotely on the system associated with the modification source.

Figure 7:
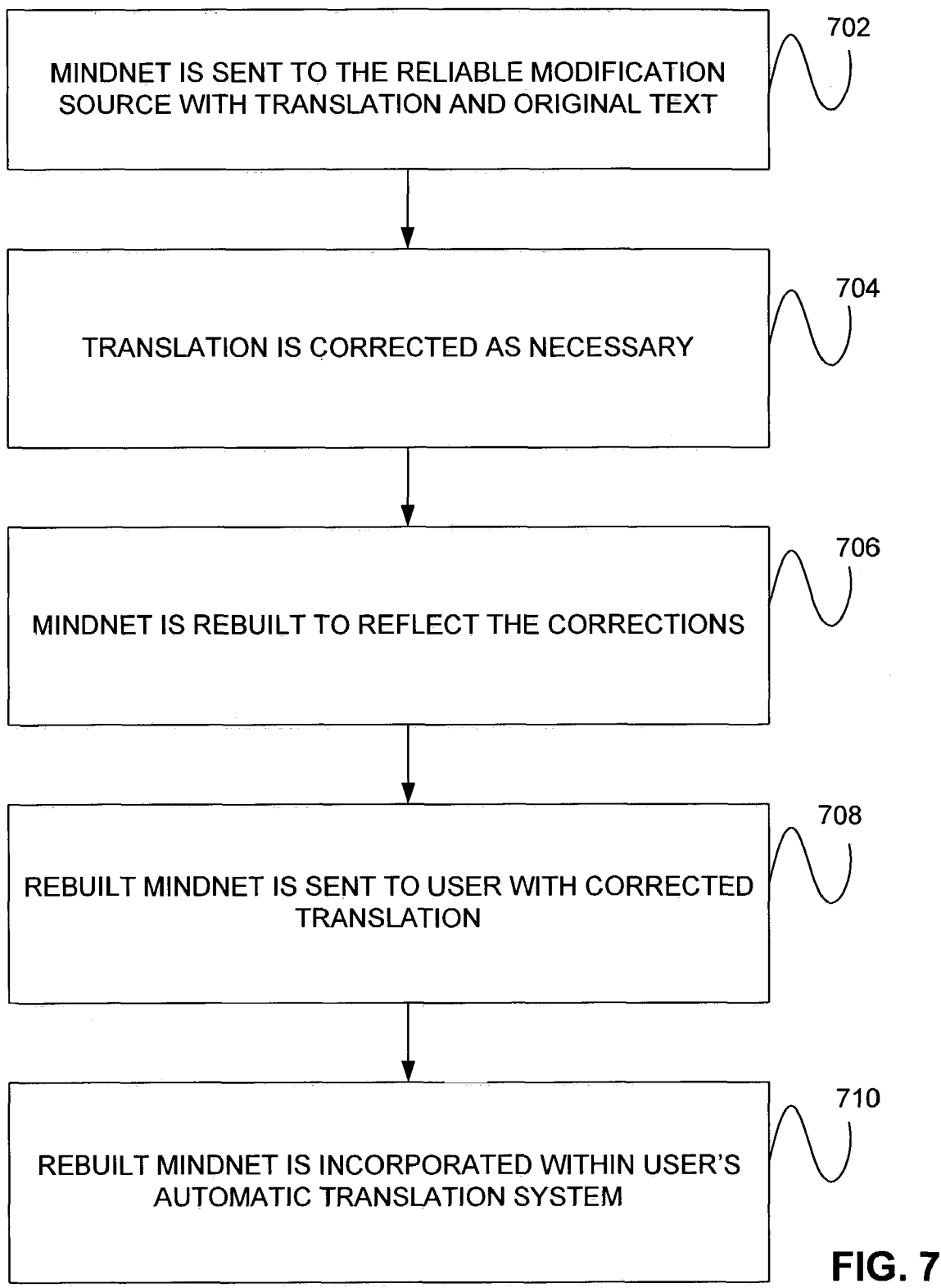
FIG. 7 is a flow chart illustrating an embodiment wherein a user's translation system is remotely updated.

FIG. 7 is a flow chart illustrating an embodiment of the present invention wherein the MindNet is updated. In accordance with block 702, the user's MindNet is sent (i.e., from a client machine) to the reliable modification source (i.e., implemented on a server) along with the translation and original text. After necessary corrections have been made to the translation (block 704), the MindNet is rebuilt to reflect the corrections (block 706). Then, the rebuilt MindNet is sent to the user (i.e., returned to the client machine) along with the corrected translation material (block 708). In accordance with block 710, the rebuilt MindNet is incorporated within the user's automatic translation system. The updated MindNet is utilized for subsequent translations. It should be noted that the described remote updating of the user's translation system can be accomplished in association with data structures other than the MindNet.

Figure 8:
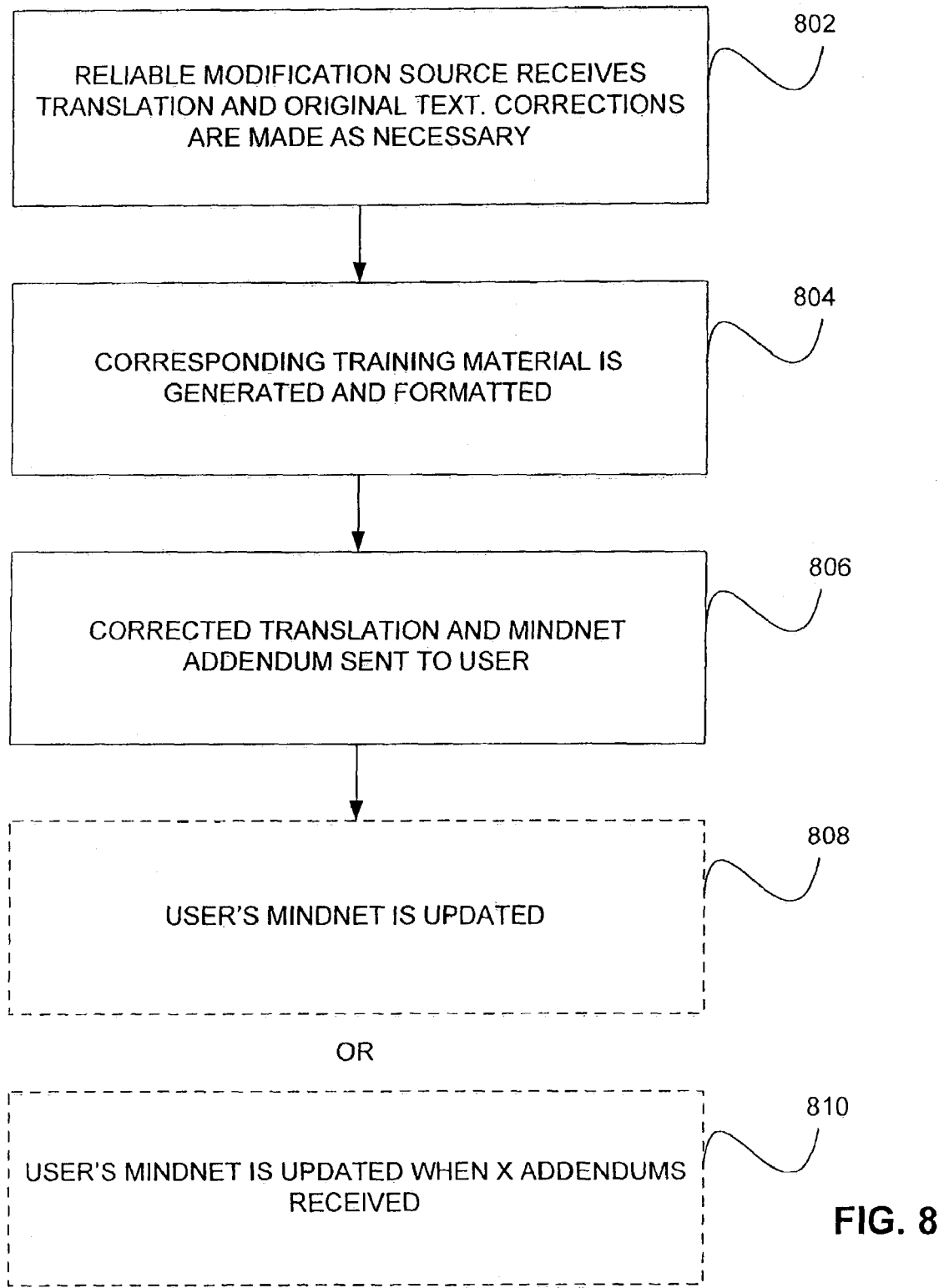
FIG. 8 is a flow chart illustrating an embodiment wherein a user's translation system is locally updated.

FIG. 8 is a flow chart illustrating another embodiment wherein the MindNet is updated without leaving the user's machine (or without leaving the user's associated server). In accordance with block 802, the reliable modification source receives translation material and a corresponding original text from the user (block 802). Corrections are made as necessary (block 802) and a corresponding MindNet addendum is compiled (block 804). In accordance with block 806, with the corrected translation, the client receives an addendum to be loaded and compiled into their MindNet (block 808) In accordance with an embodiment represented by block 810, the user's MindNet is not updated until a predetermined number of addenda have been collected. It should be noted that the described local updating of the user's translation system can be accomplished in association with data structures other than the MindNet.

In accordance with one embodiment, multiple addenda are strung together or collected on a server, i.e., the server where the reliable corrections are made. When a predetermined number of addenda have been collected, the user sends his/her MindNet to the server to be rebuilt and returned. Other schemes for updating the user's MindNet are within the scope of the present invention.

Although the present invention has been described with reference to particular embodiments, workers skilled in the art will recognize that changes may be made in form and detail without departing from the spirit and scope of the invention.

What is claimed is:

1. A computer implemented method for providing information to an automatic machine translation system to improve translation accuracy, the method comprising:
   receiving a collection of source text that is expressed in a first natural language;
   receiving from the automatic machine translation system an attempted translation that corresponds to the collection of source text, wherein the attempted translation is expressed in a natural language other than the first natural language;
   processing the attempted translation and the collection of source text to identify an error in the attempted translation; and
   providing information to the automatic machine translation system to reduce the likelihood that the error will be repeated in subsequent natural language translations generated by the automatic machine translation system,
   wherein providing information comprises providing information to be assimilated into the automatic machine translation system.

2. The method of claim 1, wherein providing information to the automatic machine translation system comprises:
   correcting the error; and
   providing a corrected translation.

3. The method of claim 1, wherein said receiving from the automatic machine translation system comprises receiving from a client upon which the automatic machine translation system is implemented.

4. The method of claim 3, wherein receiving from a client comprises receiving by way of a computer network.

5. The method of claim 4, wherein receiving by way of a computer network comprises receiving by way of the Internet.

6. The method of claim 1, wherein said receiving from the automatic machine translation system comprises receiving from a server upon which the automatic machine translation system is implemented.

7. The method of claim 6, wherein said receiving from a server comprises receiving by way of a computer network.

8. The method of claim 1, wherein providing information to be assimilated comprises providing update information to be assimilated into a knowledge source associated with the automatic machine translation system.

9. The method of claim 1, wherein providing information to be assimilated comprises providing update information to be assimilated into at least one translation correspondence associated with the automatic machine translation system.

10. The method of claim 1, wherein providing information to be assimilated comprises providing update information to be assimilated into a collection of linguistic structures associated with the automatic translation system.

11. The method of claim 10, wherein providing information to be assimilated comprises providing update information to be assimilated into a database of corresponding logical forms associated with the automatic machine translation system.

12. The method of claim 1, wherein providing information to be assimilated comprises providing update information to be assimilated into a collection of statistical parameters associated with the automatic machine translation system.

13. The method of claim 1, wherein providing information to be assimilated comprises providing update information to be assimilated into a collection of parsing information associated with the automatic machine translation system, the parsing information being information that enables a parser to provide analysis of a collection of segments.

14. The method of claim 1, wherein providing information to be assimilated comprises providing update information to be assimilated into a collection of groups of corresponding words or phrases the associations associated with the automatic machine translation system.

15. The method of claim 1, wherein providing information to be assimilated comprises providing bilingual corpora.

16. The method of claim 8, wherein providing information to be assimilated comprises providing a bilingual corpus of one or more sentences.

17. A computer-implemented method for improving the performance of an automatic machine translation system, the method comprising:
   employing the automatic machine translation system to generate a translation of a collection of source text, wherein the collection of source text is expressed in a first natural language and the translation is expressed in a natural language other than the first natural language;
   transferring the collection of source text and at least a portion of the translation to a reliable modification source;
   receiving from the reliable modification source an indication of an error in at least one portion of the translation; and
   training the automatic machine translation system such that the error will be less likely to occur for subsequent translations generated by the automatic translation system,
   wherein training the automatic machine translation system comprises updating a collection of parsing information associated with the automatic machine translation system, the parsing information being information that enables a parser to provide analysis of a collection of segments.

18. The method of claim 17, further comprising:
generating a confidence metric representing a quality measurement with regard to the translation; and
selecting the a portion of the translation transferred to the reliable modification source based at least in part upon the confidence metric.

19. The method of claim 17, wherein said transferring comprises transferring from a client computing device, upon which the automatic machine translation system is implemented, to a server computing device associated with the reliable modification source.

20. The method of claim 17, wherein said transferring comprises transferring from a server, upon which the automatic machine translation system is implemented, to a server computing device associated with the reliable modification source.

21. The method of claim 17, wherein training the automatic machine translation system comprises updating a knowledge source associated with the automatic machine translation system.

22. The method of claim 17, wherein training the automatic machine translation system comprises updating at least one translation correspondence associated with the automatic machine translation system.

23. The method of claim 17, wherein training the automatic machine translation system comprises updating a collection of linguistic structures associated with the automatic machine translation system.

24. The method of claim 23, wherein training the automatic machine translation system comprises updating a database of corresponding logical forms associated with the automatic machine translation system.

25. The method of claim 17, wherein training the automatic machine translation system comprises updating a collection of statistical parameters associated with the automatic machine translation system.

26. The method of claim 17, wherein training the automatic machine translation system comprises updating a collection of corresponding word or phrase associations associated with the automatic machine translation system.

27. The method of claim 17, wherein training the automatic machine translation system comprises providing bilingual corpora based on the error to the automatic machine translation system and enabling it to train itself based on the bilingual corpora.

28. The method of claim 17, wherein training the automatic machine translation system comprises providing a bilingual corpus of one or more sentence pairs to the automatic machine translation system.

29. A method for improving the performance of an automatic machine translation system, the method comprising:
employing the automatic machine translation system to generate a translation of a collection of source text, a confidence metric being associated with portions of the translation, and wherein the collection of source text is expressed in a first natural language and the translation is expressed in a natural language other than the first natural language;
evaluating the confidence metric and selecting a low confidence portion of the translation;
transmitting the low confidence portion across a computer network to a reliable modification source;
utilizing the reliable modification source to generate a corrected version of the low confidence portion;
generating an updated database of translation knowledge based on the corrected version of the low confidence portion;
transmitting the updated database of translation knowledge across a computer network to the automatic machine translation system; and
incorporating the updated database of translation knowledge into the automatic machine translation system to enable the automatic machine translation system to subsequently translate with greater accuracy text similar to the low confidence portion,
wherein incorporating the database of translation knowledge comprises incorporating at least one updated linguistic structure.

30. The method of claim 29, wherein utilizing the reliable modification source to generate a corrected version comprises utilizing a human translator.

31. The method of claim 29, wherein transmitting across a computer network comprising transmitting across the Internet.

32. The method of claim 29, wherein the automatic machine translation system is implemented on a client computing device.

33. The method of claim 29, wherein incorporating the database of translation knowledge comprises incorporating at least one updated translation correspondence.

34. The method of claim 29, wherein incorporating the database of translation knowledge comprises incorporating at least one update into a database of corresponding logical forms.

35. The method of claim 29, wherein incorporating the database of translation knowledge comprises incorporating at least one update into a collection of statistical parameters.

36. The method of claim 29, wherein incorporating the database of translation knowledge comprises incorporating at least one update into a collection of parsing information that enables a parser to provide analysis of a collection of segments.

37. The method of claim 29, wherein incorporating the database of translation knowledge comprises incorporating at least one update into a collection of corresponding word or phrase associations.

38. A method for improving the performance of a self-customizing automatic machine translator, the method comprising:
implementing a first self-customizing automatic translator on a first computing device;
implementing a second self-customizing automatic translator on a second computing device;
providing a reliable translation source;
enabling communication between the first and second computing devices;
receiving at the second computing device a source text;
supplying the second computing device with a corrected version of an attempted translation produced by the reliable translation source, the attempted translation being an attempted translation of the source text, and wherein the source text is expressed in a first natural language and the attempted translation is expressed in a natural language other than the first natural language;

utilizing the second self-customizing automatic translator to process the source text and the corrected version of the attempted translation to produce training information for adapting the first self-customizing automatic translator to subsequently translate text similar to the source text with greater accuracy;

transferring the training information from the second computing device to the first computing device; and assimilating the training information into the first self-customizing automatic translator to enable the first self-customizing automatic translator to subsequently translate with greater accuracy text similar to the source text.

\* \* \* \* \*